Patented May 26, 1931

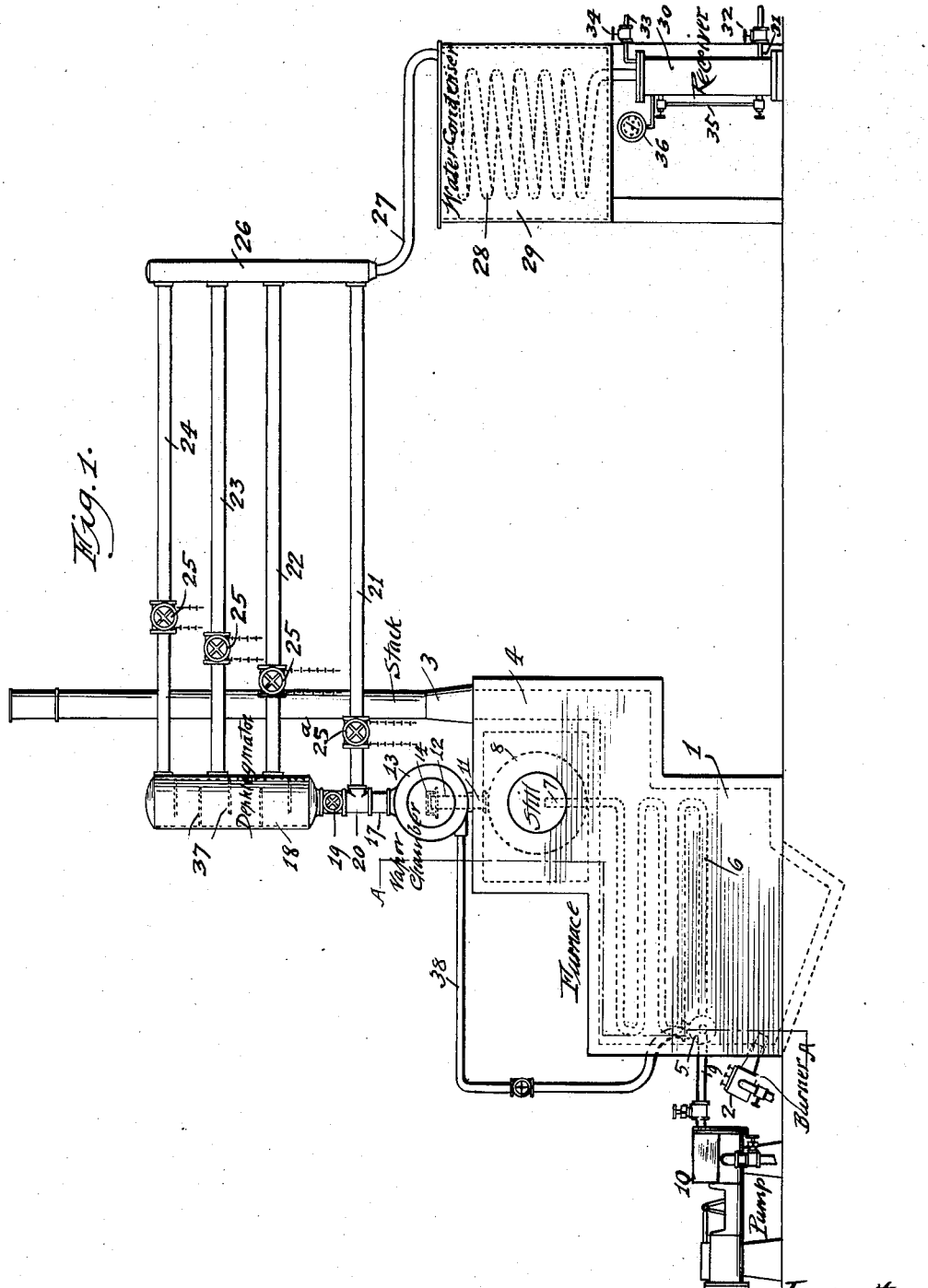

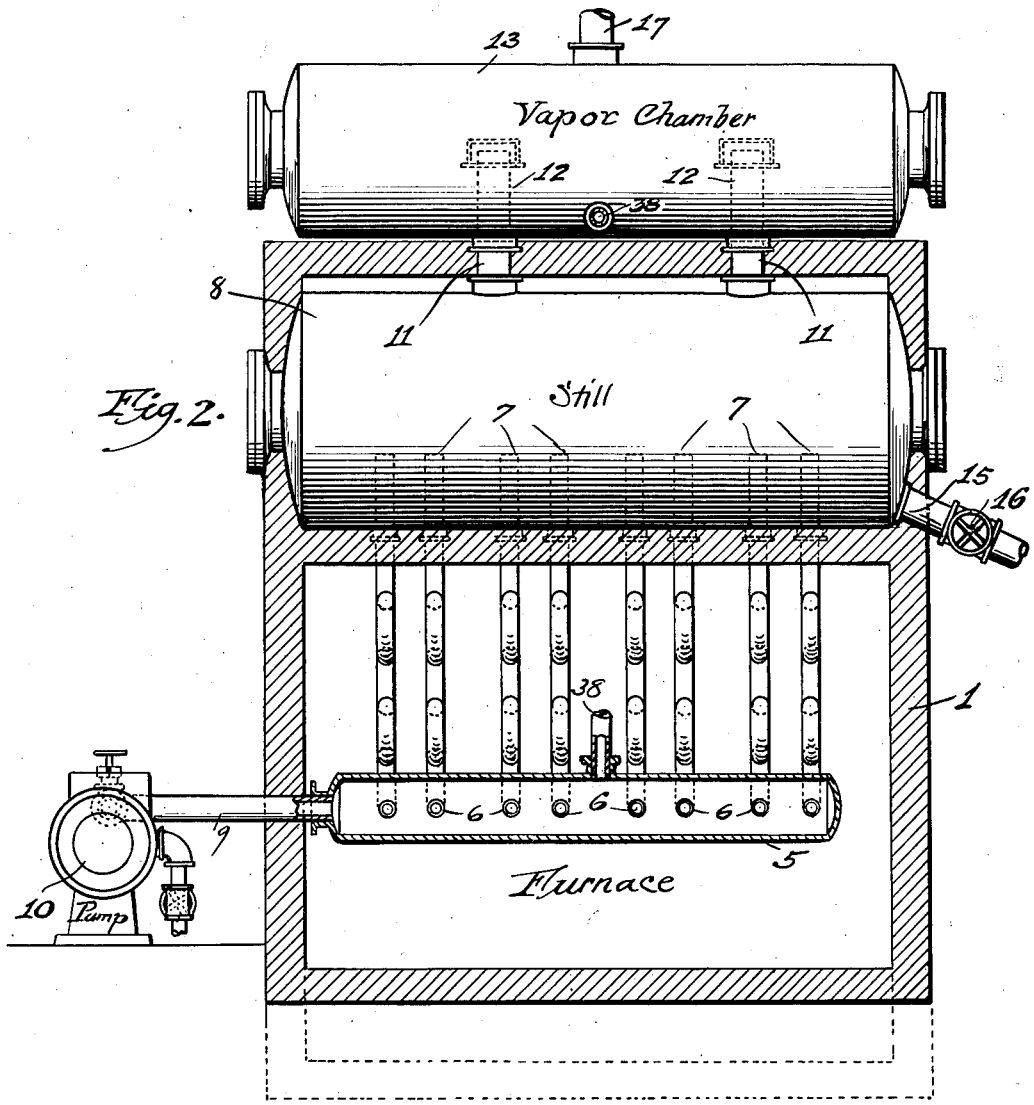

1,806,619

UNITED STATES PATENT OFFICE

GUSTAV EGLOFF AND HARRY P. BENNER, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

APPARATUS FOR TREATING HYDROCARBON OIL

Application filed September 1, 1920, Serial No. 407,401. Renewed July 2, 1928.

This invention relates to improvements in an apparatus for treating hydro-carbon oil, and refers more particularly to one adapted to crack petroleum oils to produce light hydro-carbons therefrom.

In the drawings, Fig. 1 is a side elevation of our improved apparatus. Fig. 2 is a transverse sectional view on an enlarged scale of a part of the apparatus.

Referring to the drawings, 1 designates a furnace, provided with burner 2, stack 3 and flue chamber 4. In the lower part of the furnace is supported header 5, which extends transversely to the furnace. To this header is connected a series of heating coils 6, there being eight in the present instance. These heating coils extend back and forth through the combustion chamber, and have their delivery ends projecting as shown at 7 into the lower part of a large still chamber 8. Oil is supplied to the header 5 by means of charging line 9 connected to supply pump 10, leading to any suitable source of raw oil.

The still 8 is as shown seated in the flue chamber 4 and is provided at its upper end with vapor outlets 11, extending into the vapor chamber 13 and provided with extensions 12. This chamber 13 acts both as a vapor chamber and reflux condenser. In order to prevent any reflux condensate from falling back into the pipes 12, we provide spaced cap members 14 as shown. The liquid residue in the still 8 is drawn off through pipe 15, controlled by throttle valve 16. The vapors pass out of the chamber 13 through pipe 17, leading to the lower end of dephlegmator 18. The throttle valve 19 is interposed in the line 17. The line 17 is also provided with a T connection 20 leading to draw off pipe 21. The draw off pipe 21 is provided with throttle valve 25a. The dephlegmator is also provided at various points in its height with draw off lines 22, 23 and 24, each controlled by a suitable throttle valve 25. The various pipes 21 to 24 inclusive are all connected to a common header 26, which header 26 leads by way of pipe 27 to water condenser coil 28. This water condenser coil 28 is seated in water condenser box 29, and is connected to a receiver 30. The receiver 30 is provided with liquid draw off pipe 31, controlled by throttle valve 32 and gas outlet pipe 33, controlled by throttle valve 34. It is also provided with liquid level gauge 35 and pressure gauge 36. The arrangement is such that a regulated vapor pressure may be maintained in the entire system. The dephlegmator is provided with a series of alternately disposed baffle members 37 as shown.

Describing now the manner in which the apparatus may be used, petroleum oil, as for example gas or fuel oil, may be fed into the heating coils, and while still in liquid phase, delivered to the still 8. There the vapors are subjected to the action of the heat in the flue chamber 4. These vapors pass out of the upper part of the chamber 8 into the vapor chamber 13, which as shown is located outside of the furnace. Any vapors condensed in the chamber 13 are returned by the reflux line 38 back to the header 5 for further treatment. As the vapors pass out of the vapor chamber 13, they may be diverted as follows: The valve 19 may be shut and the valve 25a opened, and all of the vapors pass directly to the header 26 and condenser coil 28. In this case the valves 25 will all be closed.

On the other hand, the valve 19 may be opened and the valve 25a closed. The vapors will then pass into the dephlegmator and out through any one or all of the pipes 22, 23 and 24. It may be desirable in certain stages of the process to draw off vapors first through the lower line 22, in which case the valves 25 in the pipes 23 and 24 may be closed. At another stage in the process, it may be desirable to draw off only through the pipe 23 or the pipe 24. This can be accomplished by suitably regulating the valves shown.

One feature of this apparatus is that it permits of the cracking of various kinds of petroleum oil in one apparatus. For example, certain oils need not be subjected to the action of the dephlegmator at all, while other oils need a maximum dephlegmation, and still others some but a lesser degree of dephlegmation so as to produce a light hydrocarbon of a given end point in maximum quantities. What we wish to emphasize is that by means of the arrangements shown, oils of different characteristics, as for example, kerosene, gas oil, fuel oils or heavy asphaltic residue or petroleum tars, may be cracked in the same apparatus. It is of course apparent that to have to construct a different apparatus for each different kind of oil may be prohibitive because of expense.

We claim as our invention:

An apparatus for cracking hydrocarbon oil, comprising a furnace, a plurality of parallel tubes disposed within said furnace, a common header connected to the inlet ends of said tubes, an enlarged chamber connected to the outlet of said tubes, a second enlarged chamber disposed outside of said furnace, to which vapors from said first enlarged chamber pass a dephlegmator, means for delivering vapors from said second enlarged chamber to said dephlegmator, said means serving also for returning reflux condensate from said dephlegmator to said second enlarged chamber, means for passing reflux condensate from said second enlarged chamber to said header, and means for taking off vapors from said dephlegmator for condensation and collection.

GUSTAV EGLOFF.
HARRY P. BENNER.